(12) United States Patent
Conn et al.

(10) Patent No.: US 11,922,474 B2
(45) Date of Patent: Mar. 5, 2024

(54) PRODUCT IDENTIFICATION ASSISTANCE TECHNIQUES IN AN ELECTRONIC MARKETPLACE APPLICATION

(71) Applicant: eBay Inc., San Jose, CA (US)

(72) Inventors: Jeremy B. Conn, Portland, OR (US); Darren Lee Hinderer, Portland, OR (US)

(73) Assignee: eBay Inc., San Jose, CA (US)

(*) Notice: Subject to any disclaimer, the term of this patent is extended or adjusted under 35 U.S.C. 154(b) by 298 days.

(21) Appl. No.: 17/389,543

(22) Filed: Jul. 30, 2021

(65) Prior Publication Data

US 2023/0036252 A1    Feb. 2, 2023

(51) Int. Cl.

| | |
|---|---|
| *G06Q 30/06* | (2023.01) |
| *G06F 3/0482* | (2013.01) |
| *G06F 16/28* | (2019.01) |
| *G06K 7/14* | (2006.01) |
| *G06Q 10/087* | (2023.01) |
| *G06Q 30/0601* | (2023.01) |
| *G06V 20/00* | (2022.01) |
| *G06V 30/19* | (2022.01) |

(52) U.S. Cl.
CPC ....... *G06Q 30/0613* (2013.01); *G06F 3/0482* (2013.01); *G06F 16/285* (2019.01); *G06K 7/1413* (2013.01); *G06Q 10/087* (2013.01); *G06Q 30/0623* (2013.01); *G06V 20/00* (2022.01); *G06V 30/19107* (2022.01)

(58) Field of Classification Search
CPC . G06Q 30/0613; G06F 16/285; G06F 3/0482; G06V 20/00
USPC ........................................... 705/26.41
See application file for complete search history.

(56) References Cited

U.S. PATENT DOCUMENTS

| | | | |
|---|---|---|---|
| 10,467,504 B1 * | 11/2019 | Hamedi | G06F 18/22 |
| 10,489,835 B2 | 11/2019 | Melcher et al. | |
| 2006/0077941 A1 * | 4/2006 | Alagappan | H04W 4/18 370/338 |

(Continued)

FOREIGN PATENT DOCUMENTS

| | | | | |
|---|---|---|---|---|
| CN | 110329618 A | * | 10/2019 | |
| WO | WO-2011085500 A1 | * | 7/2011 | G06Q 30/06 |

OTHER PUBLICATIONS

Article, U.S. Patents Awarded to Inventors in Oregon (Feb. 13) Targeted News Service [Washington, D.C] Feb. 13, 2013, retrieved from Dialog on Jul. 12, 2023 (Year: 2013).*

(Continued)

*Primary Examiner* — Yogesh C Garg
(74) *Attorney, Agent, or Firm* — FIG. 1 Patents (57) ABSTRACT

A system for assisting a user in listing items for sale in an electronic marketplace via an electronic marketplace application is disclosed. A product identification technique for assisting the user in listing of the item for sale in the electronic marketplace is determined based on initial user input provided by the user. A prompt to provide additional user input is then displayed to the user in the user interface of the electronic marketplace application, where the additional user data corresponds to the determined product identification technique for assisting the user. A listing for the item is generated based on the additional input provided by the user, and the listing is displayed to the user in the user interface of the electronic marketplace application.

20 Claims, 6 Drawing Sheets

(56) References Cited

U.S. PATENT DOCUMENTS

| | | | |
|---|---|---|---|
| 2011/0099085 A1 | 4/2011 | Hamilton et al. | |
| 2013/0297453 A1 | 11/2013 | Racco | |
| 2015/0347739 A1* | 12/2015 | Matsushima | G06F 21/32 |
| | | | 726/20 |
| 2016/0350840 A1 | 12/2016 | Sreekumar | |
| 2016/0379158 A1* | 12/2016 | Vander | G06Q 10/06395 |
| | | | 705/7.41 |
| 2019/0259499 A1* | 8/2019 | Hong | G16H 50/20 |
| 2019/0266614 A1 | 8/2019 | Grandhi et al. | |
| 2021/0142376 A1* | 5/2021 | Guy | G06N 5/04 |
| 2021/0264161 A1* | 8/2021 | Saraee | G06F 18/2413 |
| 2022/0147970 A1* | 5/2022 | Babcock | G06Q 20/4016 |
| 2022/0385711 A1* | 12/2022 | Willemsen | H04N 21/2187 |

OTHER PUBLICATIONS

"Article, Microsoft Simplifies Embedding Image Recognition Into Mobile Apps", ICT Monitor Worldwide [Amman] Jan. 24, 2018, retrieved from Dialog on Sep. 12, 2023 (Year: 2018).*

Extended European Search Report received for European Patent Application No. 22185839.2 dated Nov. 22, 2022, 7 Pages.

* cited by examiner

PRODUCT IDENTIFICATION ASSISTANCE TECHNIQUES IN AN ELECTRONIC MARKETPLACE APPLICATION

BACKGROUND

Various applications, such as electronic marketplace applications, are commonly utilized by users to sell and/or buy various items in an electronic marketplace. To list an item for sale or to find an item for purchase in the electronic marketplace, a user generally must enter or otherwise provide various information for identification of a product that may match the item. A listing for the item may then be generated based on product information associated with the product that matches the item and/or the matching product may be displayed for the user to enable the user to purchase the item. Entering or otherwise providing the various information for identifying a product that matches the item may be burdensome and time consuming for the user. Moreover, the various information entered or otherwise provided by the user may not be best suited for identification of a product that matches the particular type of item that the user is attempting to sell or buy, and may therefore lead to inaccurate identification of the product matching the item for sale or purchase by the user.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to systems and methods for obtaining relevant information for identifying items that are being listed for sale via electronic marketplace applications. In aspects, item identification process may include dynamically determining, based on initial user input indicative of an item, a product identification technique that may best assist the user in identifying a product that matches the item. The item identification process may further include prompting the user to provide additional user input corresponding to the product identification technique, and identifying a product that may match the item based at least in part on the additional user input provided by the user. A listing may then be generated based on product information associated with the identified product that may match the item. The user may thus be dynamically guided to provide additional information that may best assist the user in creating a listing for the item.

In aspects, a system for assisting a user in listing an item for sale in an electronic marketplace via an electronic marketplace application is provided. The system comprises a processor and memory including instructions which, when executed by the processor, causes the processor to perform operations. The operations include receiving initial user input indicative of the item, the initial user input having been entered by the user into a user interface of the electronic marketplace application. The operations also include determining, based on the initial user input, a product identification technique for assisting the user in listing of the item for sale in the electronic marketplace. The operations further include causing a prompt to be displayed to the user in the user interface of the electronic marketplace application to prompt the user to provide additional user input corresponding to the determined product identification technique. The operations further still include receiving the additional user input provided by the user, and generating, based on the additional input provided by the user, a listing for sale of the item. The operations additionally include providing the listing for display to the user in the user interface of the electronic marketplace application.

In further aspects, a method for assisting users in listing items for sale in an electronic marketplace via an electronic marketplace application is provided. The method includes detecting initial user input indicative of an item, the initial user input having being entered by the user into a user interface of the electronic marketplace application. The method also includes displaying a prompt in the user interface of the electronic marketplace application to prompt the user to provide additional user input, the additional user input corresponding to a product identification technique to be used for assisting the user in listing the user in listing of the item for sale in the electronic marketplace, wherein the product identification technique to be used in assisting the user is determined based on the initial user input indicating of the item. The method further includes receiving the additional user input provided by the user, and displaying a listing for the item to the user in the user interface of the electronic marketplace application, the listing generated based on information associated with a product identified using the product identification technique based on the additional user input provided by the user.

In still further aspects, a computer storage medium is provided. The computer storage media encodes computer executable instructions that, when executed by at least one processor, perform a method. The method includes receiving initial user input indicative of an item, the initial user input having been entered by the user into a user interface of the electronic marketplace application. The method also includes determining, based on the initial user input, a product identification technique for assisting the user in listing of the item for sale in the electronic marketplace. The method further includes causing a prompt to be displayed to the user to provide additional user input corresponding to the selected product identification technique for assisting the user. The method further still includes receiving the additional input provided by the user, and determining, based on the additional input provided by the user, a listing for the item. The method additionally includes causing the listing to be displayed to the user in the user interface of the electronic marketplace application.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods for obtaining relevant information for identifying items that are being listed for sale via electronic marketplace applications. In aspects, item identification process may include dynamically determining, based on initial user input indicative of an item, a product identification technique that may assist the user in identifying a product that matches the item. The item identification process may further include prompting the user to provide additional user input corresponding to the product identification technique, and identifying a product that may match the item based at least in part on the additional user input provided by the user. As an example, the system may determine, based on the initial one or more keywords that may be provided by the user, that the user is attempting to create a listing for a book. In response to a determination that the user is attempting to create a listing for a book, a suggestion to scan a barcode on the back cover of the book or to provide the ISBN may be provided to the user. On the other hand, if the system determines, based initial user input, that the user is attempting to create a listing for sale of a trading card, the system may provide a suggestion to provide an image of the trading card. In these ways, the user may be dynamically guided to provide additional user input that may best assist the user in creating a listing for the item.

It should be appreciated that although, for exemplary purposes, described aspects generally relate to listing items for sale via an electronic marketplace application, the present methods and systems are not so limited. For example, dynamic product identification assistance techniques described herein may be used to assist users in identifying products that the users may wish to purchase via an electronic marketplace application. In some aspects, dynamic product identification assistance techniques described herein may be used in applications other than selling or buying items in an electronic marketplace via electronic marketplace applications.

Figure 1:
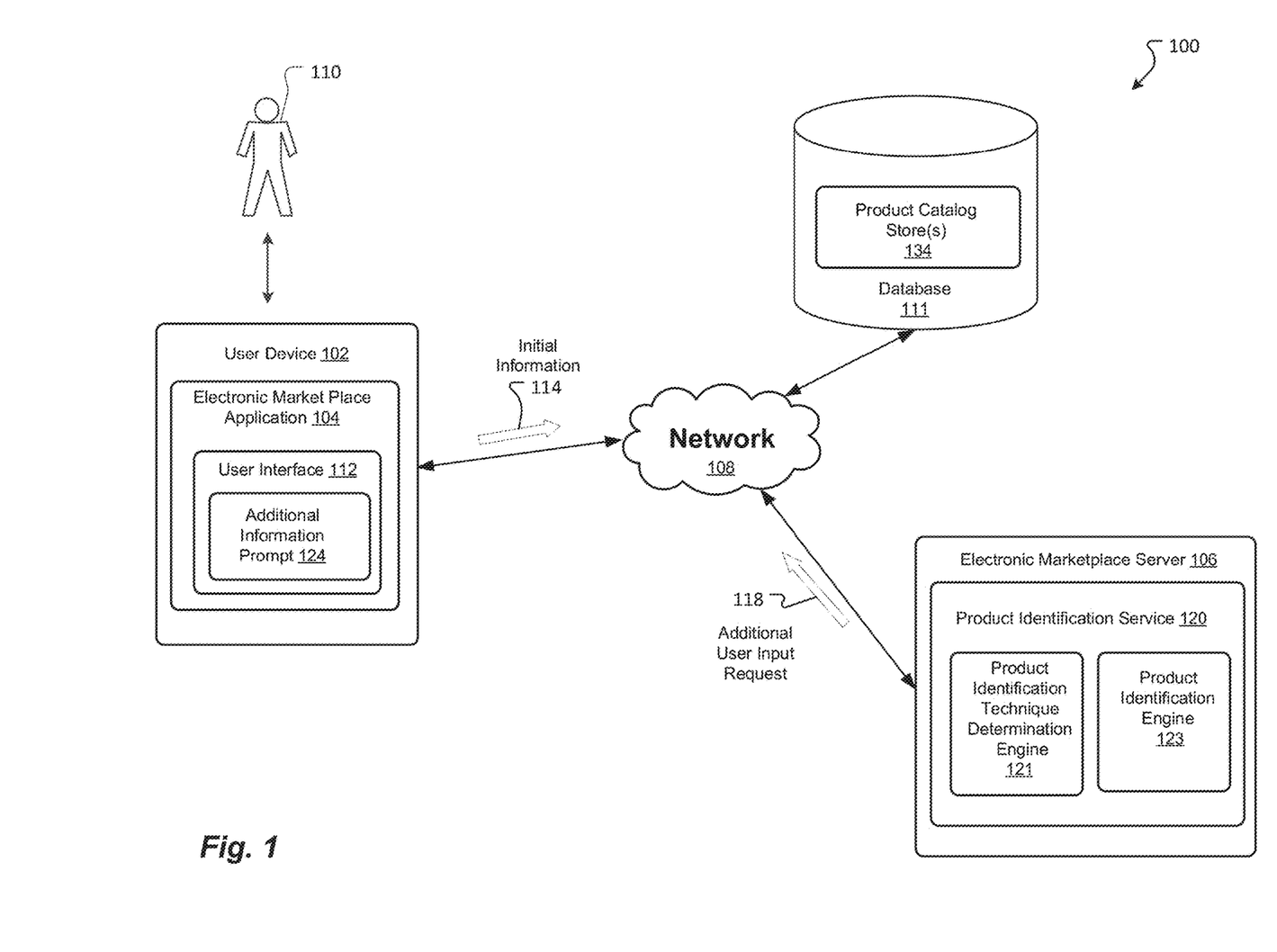
FIG. 1 illustrates an exemplary system for dynamically prompting users to provide additional item identification information to assist the users in listing items for sale using electronic marketplace applications, in accordance with aspects of the present disclosure.

FIG. 1 illustrates an exemplary system 100 for dynamically prompting users to provide additional information to assist the users in listing items for sale using electronic marketplace applications, in accordance with aspects of the present disclosure. The system 100 may include a user device 102 that may be configured to run or otherwise execute a client application 104. Although only a single user device 102 is illustrated in FIG. 1, in some examples the system 100 may include multiple user devices 102. The one or more user devices 102 may include, but are not limited to, laptops, tablets, smartphones, and the like. Applications 104 that may run or otherwise execute on the one or more user devices 102 may include applications that allow users to engage with an electronic marketplace (sometimes referred to herein as "electronic marketplace applications"), for example to allow users to post listings to sell items and/or to browse listing to buy items in the electronic marketplace. In some examples, the applications 104 may include web applications, where such applications 104 may run or otherwise execute instructions within web browsers. In some examples, the applications 104 may additionally, or alternatively, include native client applications residing on the user devices 102. The one or more user devices 102 may be communicatively coupled to an electronic marketplace application server 106 via a network 108. The network 108 may be a wide area network (WAN) such as the Internet, a local area network (LAN), or any other suitable type of network. The network 108 may be a single network or may be made up of multiple different networks, in some examples.

With continued reference to FIG. 1, the system 100 may include a product database 111. The product database 111 may be communicatively coupled to the electronic marketplace server 106 and/or to the user device 102 via the communication network 108, as illustrated in FIG. 1, or may be coupled to the electronic marketplace application server 106 and/or to the user device 102 in other suitable manners. For example, the product database 111 may be directly connected to the electronic marketplace server 106, or may be included as part of the meeting electronic marketplace server 106, in some examples. The product database 111 may be a single database or may include multiple different databases.

In aspects, the application 104 may allow a user 110 to create listings for sale of items for an electronic marketplace and/or to search for items for purchase in the electronic marketplace. To initiate listing of, or search for, a particular item, the user 110 may enter or otherwise provide initial information indicative of the item via a user interface 112 of the application 104. For example, the user 110 may begin entering one or more keywords describing the item into the user interface 112. The application 104 may generate one or more messages 114 containing initial information provided by the user 110 and may transmit the one or more initial information messages 114 via the network 108 to the electronic marketplace application server 106. In aspects, the application 104 may generate one or more initial information messages 114 to dynamically transmit the initial information to the electronic marketplace application server 106 as the information is being entered by the user 110 into the user interface 112. For example, the application 104 may generate one or more initial information messages 114 to transmit each key stroke or each string containing multiple key strokes to the electronic marketplace application server 106 dynamically in response to detecting the keystrokes or the strings of keystrokes entered by the user 110 into the user interface 112.

The electronic marketplace application server 106 may receive the one or more initial information messages 114, and may provide the one or more initial information messages 114 to a product identification service 120 that may be running or otherwise executing on the electronic marketplace application server 106 and may include a product identification technique determination engine 121 and a product identification engine 123. In aspects, the product identification technique determination engine 121 may determine, based on the initial information provided by the user 110, a product identification technique that may best assist the user 110 in generating a listing for sale of the item via the electronic marketplace application 104. For example, the product identification technique determination engine 121 may determine one or more computer vision services that may be employed to identify a product that may match the item being listed for sale by the user 110. The one or more computer vision services may include, but are not limited to, i) image recognition, ii) barcode scanning and iii) optical character recognition/image recognition. In aspects, the product identification technique determination engine 121 may determine a category of the item that is being listed by the user 110, and may determine the product identification technique based at least in part on the category of the item. For example, the product identification technique determination engine 121 may determine that the item being listed is a trading card, and may determine that image recognition may best assist the user in identifying a trading card that matches the trading card being listed by the user 110. In other example, the product identification technique determination engine 121 may determine that the item being listed belongs to a category (e.g., books, phones, shoes, mugs, etc.) other than trading cards and may determine that a product identification technique other than image recognition (e.g., a barcode scan, OCR, etc.) may best assist the user in identifying the item and/or locating a product matching the item. As will be described in more detail below, in some aspects, the product identification technique determination engine 121 may determine a product identification technique additionally or alternatively based on one or more attributes that may be extracted from the initial user input provided for the item.

The product identification technique determination engine 121 may generate an additional user input request message 118, and may cause the additional user input request message 132 to be transmitted via the network 108 to the user device 102. The additional information request message 118 may indicate the determined product identification technique and/or request additional user input that corresponds to the determined product identification technique. The additional user input that the user may be prompted to provide may comprise one or more of i) a scan of a barcode associated with the item, ii) an image of the item, iii) an image of a particular portion of the item, and iii) additional information specific to a category corresponding to the item.

The additional user input request message 118 may be received by the user device 102 and may be provided to the electronic marketplace application 104. In response to receiving the additional user input request 118, the electronic marketplace application 104 may display a prompt 124 in the user interface 112 to prompt the user 110 to provide the requested additional input. For example, in an aspect in which the additional user input request message 118 indicates that an image of the item should be obtained from the user 110, the prompt 124 may comprise an icon or a button for launching a camera experience in the application 104. The user 110 may click or otherwise engage with the camera icon or button to access a camera on the user device 102 via the application 104, and may provide the requested images or images of the item from within the application 104. In some aspects, if the additional user input request 118 additionally indicates an specific area of the item of which the image should be obtained from the user 110, the prompt 124 may additionally display information regarding the specific area or areas of the item to direct the user 110 to point or focus the camera at the specific area or areas of the item.

As another example, in an aspect in which the additional user input request message 118 indicates that a barcode scan should be obtained from the user 110, the prompt 124 may comprise a barcode icon or button for launching a barcode experience in the application 104. The user 110 may click or otherwise engage with the barcode icon or button to access a barcode scanner on the user device 102 via the application 104, and may provide the requested images or images of the item from within the application 104. In some aspects, if the additional user input request 118 additionally indicates a location of the barcode on the item or on packaging of the item, the prompt 124 may display information to direct the user to the location of the barcode on the item. Yet another example, in an aspect in which the additional user input request message 118 indicates that a particular product experience should be engaged to obtain additional information from the user 110, the prompt 124 may be an entry point for launching the particular product experience that may guide the user 110 to provide additional information. As still another example, in an aspect in which the additional user input request message 118 includes one or more questions to be provided to the user 110, the prompt 124 may display the one or more questions to the user 110, and may allow the user 110 to select or otherwise enter answers to the one or more questions presented to the user 110. In other examples, the prompt 124 may direct or guide the user 110 to provide other types of additional information that may be indicated in the additional user input message 118.

In aspects, the application 104 may provide additional information obtained from the user 110 to the electronic marketplace server 106. The product identification service 120 may use the additional user input to identify the item and/or to create a listing for the item. For example, the product identification engine 123 of the product identification service 120 may search one or more product catalogues 134 in the database 111 for catalogue entries that may match the item and to obtain, from the one or more matching catalogue entries, information for populating a listing for the item. Additionally or alternatively, the product identification engine 123 may use the additional information for directly populating the listing for the item.

In some aspects, the product identification service 120 may implement an iterative process of requesting additional user input from the user 110 to better hone in on a product that may match the item being listed by the user 110. As an example, the product identification engine 123 may identify based on the additional user input several products that may potentially match the item and may determine that the several potential products differ in one or more aspects, such as a color, a size, etc. of the item. In response, the product identification engine 123 may generate a further additional input request to prompt the user 110 to provide the one or more aspects, such as the color and/or the size of the item. Generally, directing the user 110 to provide specific additional user input, as determined based on the initial user input provided for the item, allows the electronic marketplace server application 120 to more efficiently and accurately identify the item and/or create a listing for the item, while also providing the user 110 an easier and more efficient process of listing or purchasing the item in the electronic marketplace.

While the product identification technique determination engine 121 and the product identification engine 123 are illustrated as being executed by the electronic marketplace server 106, the product identification technique determination engine 121 and/or the product identification engine 123 may be at least partially executed at the electronic marketplace application 104. For example, the product identification technique determination engine 121 may operate locally at the electronic marketplace application 104 to determine a product identification technique based on initial user input entered by the user 110 into the user interface 112 of the electronic marketplace 104. Moreover, the product identification engine 123 may at least partially reside at the meeting client application 104.

Figure 2:
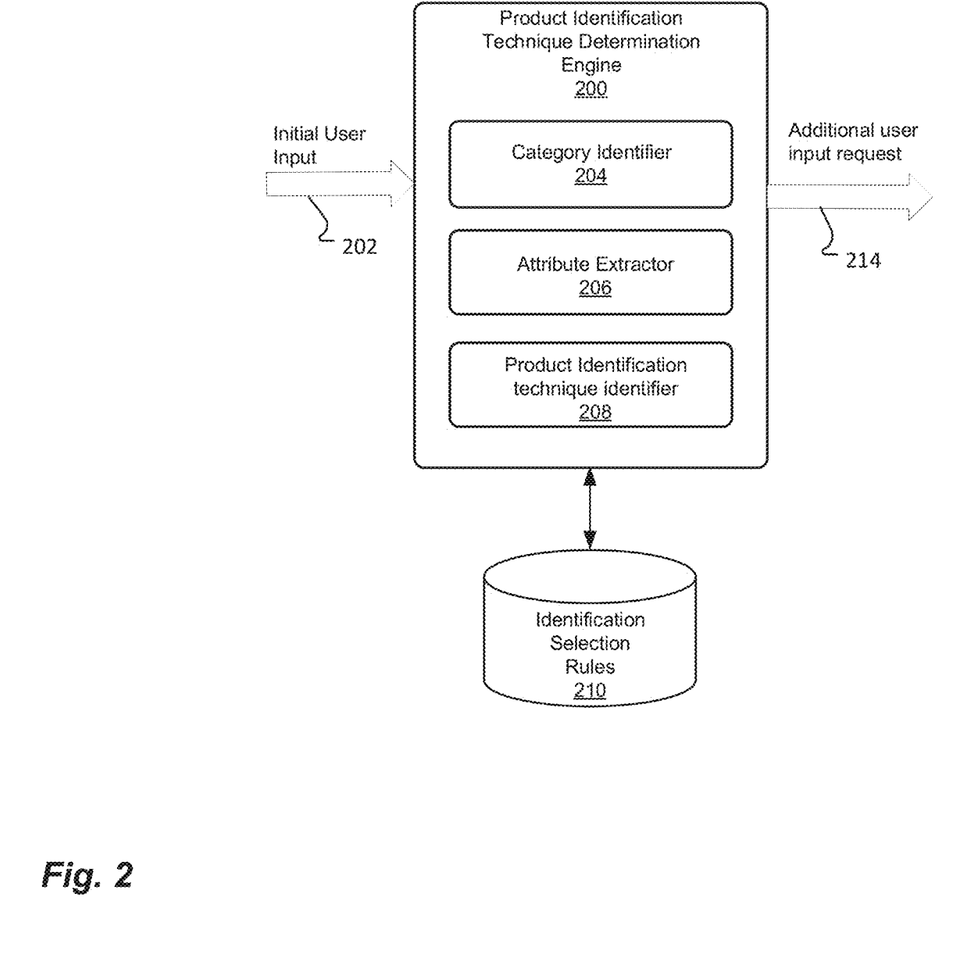
FIG. 2 depicts an example of an additional information type identification engine, in accordance with aspects of the present disclosure.

FIG. 2 depicts an example of a product identification technique determination engine 200, in accordance with aspects of the present disclosure. In an example, the product identification technique determination engine 200 corresponds to the product identification technique determination engine 121 of FIG. 1. For ease of explanation, the product identification technique determination engine 200 is described with reference to FIG. 1. In another example, the product identification technique determination engine 200 may be utilized in a system different from the system 100 of FIG. 1.

The product identification technique determination engine 200 is configured to receive initial user input 202 that may be provided by the user 110 via the user interface 106 of the electronic marketplace application 104. The initial user input 202 may be indicative of an item that the user 110 is attempting to list for sale via the electronic marketplace application 104. The initial user input 202 may comprise textual input, such as one or more keywords that may be initially entered by the user 110, for example. In aspects, the one or more keywords may be provided to the product identification technique determination engine 200 dynamically as the user 110 is entering the initial input. For example, the initial user input 202 may comprise a plurality of request messages that may be generated by the application 104 to include consecutive keystrokes or strings of keystrokes detected by the application 104 as the user is entering the initial input.

In aspects, the product identification technique determination engine 200 is configured to determine, based on the initial user input 202, a type of additional input that should be obtained from the user 110 to better assist the user 110 in listing of the item for sale via the electronic marketplace application 104. For example, the product identification technique determination engine 200 may select a type of additional information for a plurality of available types including, for example, one or more of an image or a video stream of the item, an image or a video stream of a particular area of the item, an image of a barcode associated with the item, answers to one or more specific questions about the item, etc. The product identification technique determination engine 200 may generate an additional user input request 212 indicating the type of additional information to be obtained from the user 110, and may cause the additional information 212 to be transmitted to the user device 102 via the network 108. The electronic marketplace application 104 may display a prompt in the user interface 10 to guide the user to provide the additional information via the electronic marketplace application 104.

In aspects, the product identification technique determination engine 200 includes a category identifier 204, an attribute extractor 206 and a technique identifier 208. The category identifier 204 may be configured to determine a category of the item. For example, the category identifier 204 determines a category of the item by mapping one or more keywords provided in the initial user input to a category. As a more specific example, the category identifier 204 may map keywords such as book, story, novel, etc. to a book category; keywords such as phone, iPhone, Android, etc. to a cell phone category; keywords such as sneaker, shoe, sandal, etc. to a shoe category; keywords laptop, portable computer, etc. to a portable computer category; etc. In some aspects, the category identifier 204 may indirectly determine the category from the initial user input, for example by determining that the item is a book by detecting that the user is entering a novel title, such as a Harry Potter novel title, for example.

The attribute extractor 206 may extract one or more specific attributes from the initial user input. For example, the attribute extractor 206 may extract, from the one or more keywords provided by the user, a brand of the item, a color of the item, a size of the item, etc. In some aspects, the attribute extractor 206 may extract one or more specific attributes based at least in part on the category identified by the category identifier 204. For example, if the category identifier 204 identifies that the item belongs to the shoe category and the initial user input includes a number nine (9), the attribute extractor 206 may extract the number nine as the shoe size of the shoe. Additionally, if the initial user input includes the word Nike, the attribute extractor 206 may extract Nike as a brand of the shoe.

The technique identifier 208 may determine a product identification technique that may best assist the user in listing the item for sale via the electronic marketplace application. In an aspect, the technique identifier 208 may determine the product identification technique based on one or both of i) the category of the item identified by the category identifier 204 and ii) the one or more attributes extracted by the attribute extractor 206. As an example, if the category identifier 204 identifies the item as a book, the technique identifier 208 may determine that a barcode scan or an ISBN may best assist the user in listing the item. Moreover, the technique identifier 208 may determine that the barcode to be scanned appears on the back cover of the book. As another example, if the category identifier 204 identifies the item as a shoe and the attribute extractor 206 extracts Nike as the brand of the shoe, the technique identifier 208 may determine that a barcode scan may best assist the user in listing the item and may further determine that the barcode to be scanned is located on the underside of the tongue of the shoe. As yet another example, if the category identifier 204 identifies the item as a laptop and the attribute extractor 206 extracts a particular brand (e.g., Toshiba) as the brand of the laptop, the technique identifier 208 may determine that OCR may best assist the user and may further determine that the user should provide an image of a particular area (e.g., bottom right corner) of the back side of the laptop because that is where a model is typically indicated for the particular laptop brand.

In an aspect, the technique identifier 208 determine the product identification technique by searching an identification selection rules database 210 based on the category of the item and/or one or more attributes extracted from the initial user input for the item. The identification selection rules database 210 may store associations between categories, attributes and product identification techniques and, in some aspects, additional information such as specific barcode locations, item areas for which images should be obtained, etc. In some aspects, the technique identifier 208 may additionally, or alternatively, utilize other suitable identification techniques, such as one or more machine learning models (e.g., neural networks) that may be trained to determine a product identification technique based on one or more of i) initial input provided for an item, ii) a category of the item, iii) one or more attributes extracted from the initial input provided for the item, iv) additional input that may be provided for the item, etc.

The product identification technique determination engine 200 may be configured to generate an additional user input request 214, and may cause the additional user input request 214 to be transmitted to the electronic marketplace application 104 to cause a prompt for obtaining additional information corresponding to the determined product identification technique to be displayed to the user 110 in the user interface 112 of the marketplace application 104.

Figure 3:
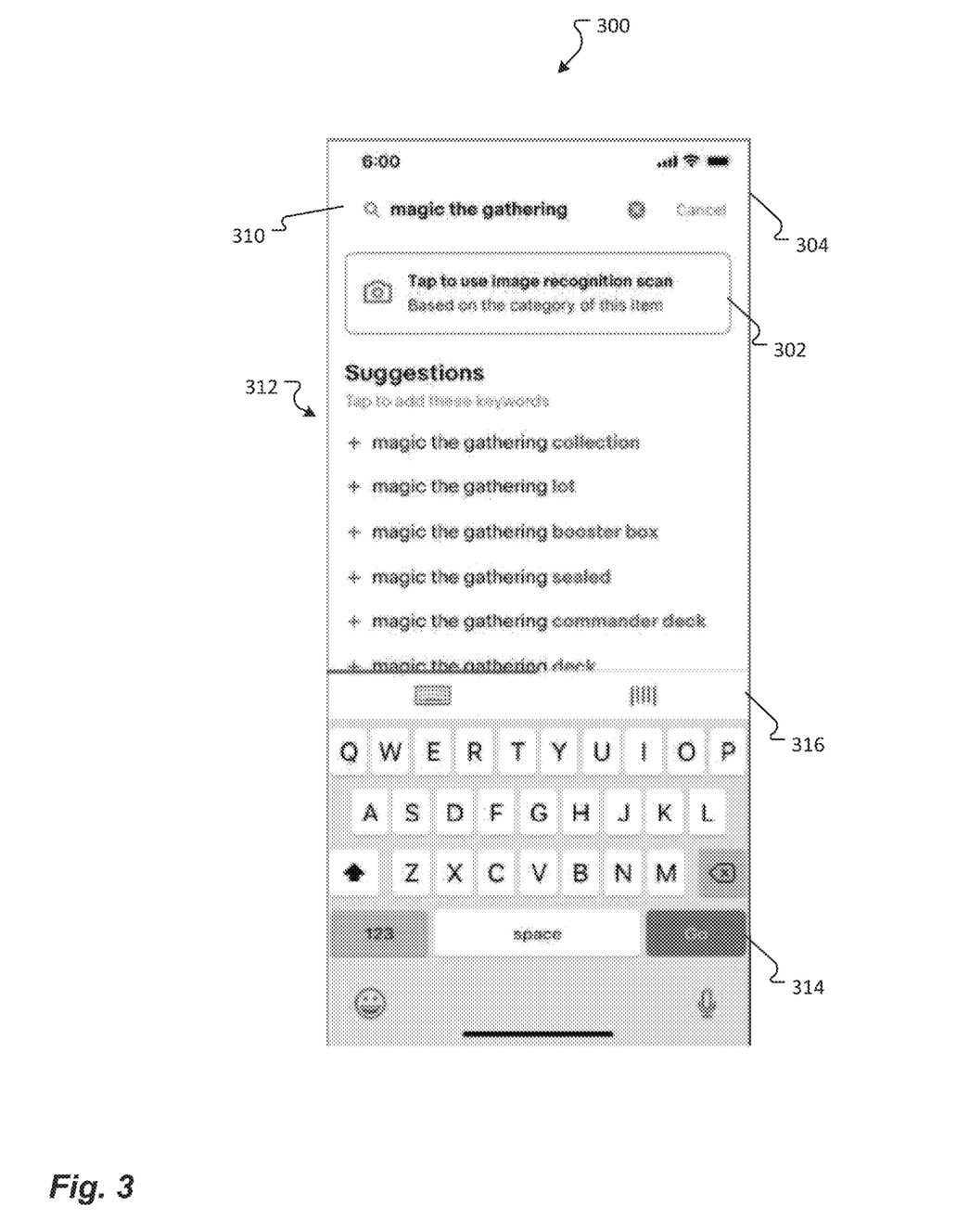
FIG. 3 depicts an example prompt that may be dynamically displayed in a user interface of an electronic marketplace application to prompt a user to provide additional item identification information, in accordance with aspects of the present disclosure.

FIG. 3 depicts an example user interface prompt 302 that may be dynamically displayed in a user interface 304 of an electronic marketplace application 300 to prompt a user to provide additional item identification information, in accordance with aspects of the present disclosure. In an aspect, the electronic marketplace application 306 may correspond to the electronic marketplace application 104 of the system 100 of FIG. 1. The user interface prompt 302 may correspond to the user interface prompt 124 of FIG. 1. For ease of explanation, the user interface prompt 302 is described with reference to FIG. 1. In another example, the user interface prompt 302 may be dynamically displayed to a user in a system different from the system 100 of FIG. 1.

The user interface 304 may display a field 310 (e.g., a search box) for entering initial information indicative of the item. The field 310 may allow the user 110 to enter, for example, one or more keywords that may described the item. As the user is entering the one or more keywords that may describe the item, the application 104 may generate one or more requests for suggestions to be transmitted to the suggestion service 120 on the server device 106. The one or more requests may include the initial information being entered by the user 110 into the field 310. In an aspect, the application 104 may generate a plurality of requests each including information indicating one or more keystrokes detected as the user 110 is entering the initial information into the field 310. As an example, in an aspect, a request per keystroke may be generated by the application 104. As another example, a request per multiple (e.g., 2, 3, 4, etc.) consecutive keystrokes may be generated by the application 104.

The one or more requests generated by the application 104 may be transmitted via the network 108 to the server device 106, and may be provided to the product identification service 120 running or otherwise executed on the server device 106. The product identification technique determination engine 121 of the suggestion service 120 may determine, based on the initial user input received from the user device 102, a product identification technique that may best assist the user in listing the item for sale via the application 104. For example, the product identification technique determination engine 121 may determine one or more computer vision services that may be employed to identify a product that may match the item being listed for sale by the user 110. The one or more computer vision services may include, but are not limited to, i) image recognition, ii) barcode scanning and iii) optical character recognition/image recognition. In aspects, the identification technique determination engine 121 may determine a category of the item that is being listed by the user 110, and may determine the product identification technique based at least in part on the category of the item. For example, the identification technique determination engine 121 may determine that the item being listed is a trading card, and may determine that image recognition may best assist the user in identifying a trading card that matches the trading card being listed by the user 110. In other examples, the identification technique determination engine 121 may determine that the item being listed belongs to a category (e.g., books, phones, shoes, mugs, etc.) other than trading cards and may determine that a product identification technique other than image recognition (e.g., a barcode scan, OCR, etc.) may best assist the user in identifying the item.

In some aspects, the identification technique determination engine 121 may additionally determine, based on the initial user input, additional information that may assist the user 110, such as a location of a barcode to be scanned by the user 110, an area of the item at which the user 110 may point the camera for obtaining an image, etc. Additionally or alternatively, the identification technique determination engine 121 may additionally determine, based on the initial user input, one or more questions about the item that may be presented to the user, a particular user interface experience for listing the item that may be suggested to the user, etc.

The suggestion service 120 may cause the prompt 302 to be displayed in the user interface 304 to prompt the user 110 to provide additional information corresponding to the product identification technique determined by the identification technique determination engine 121. In aspects, the suggestion service 120 causes the prompt 302 to be dynamically displayed to the user 110 in the user interface 304 as the user 110 is entering the initial user input into the field 310. In an aspect, the suggestion service 120 may generate an additional user input request indicating the product identification technique determined by the identification technique determination engine 121 and/or information regarding additional user input that corresponds to the product identification technique determined by the identification technique determination engine 121 and may cause the additional user input request to be transmitted to the user device 102. Such additional user input request may be, for example, transmitted to the user device 102 dynamically, in response to the product identification technique determination made by the product identification technique determined by the identification technique determination engine 121, as the user 110 is entering the initial user input into the user input field 310. In response to receiving the additional user input request, the application 104 may dynamically display the prompt 302 to prompt the user 110 to provide the additional information. The prompt 302 may be, for example, a button or an icon that may provide an entry point to a camera that may be used to provide one or more images of the item, as in the case when the item being listed by the user 110 is a trading card, as in the illustrated embodiment. The user 110 may therefore tap on or otherwise engage with the button or the icon to launch a camera experience in the application 104. The user 110 may then point a camera of the user device 102 at the trading card, thereby providing one or more images of the trading card to the product identification service 120. In other aspects, the prompt 302 may be, for example, a button or an icon that may provide an entry point to a barcode scanner experience that may be used to provide a scan of barcode associated with the item, an entry point to initiate a custom experience for listing the item, etc.

In aspects, the user interface 304 additionally provides one or more suggestions 312 providing additional keywords for selection by the user 110. The additional keywords may be identified based on the initial keywords entered by the user 110 into the field 310. In aspects, the additional keywords may be determined by the product identification service 120 concurrently with the product identification technique determination by the product identification service 120. The additional keywords may be transmitted to the user device 102 from the product identification service 120 concurrently with the indication of the determined product identification technique being transmitted to the user device 102 from the product identification service 120. For example, one or more additional keywords identified based on the on the initial keywords entered by the user 110 may be included in the additional user request message that also indicates the determined product identification technique identified based on the on the initial keywords entered by the user 110 and/or may be included in one or more messages transmitted from the product identification service 120 separately from the additional user request message.

In an aspect, the user 110 may select a suggestion 312 in addition to or instead of engaging with the prompt 302. Thus, one or both of the additional user input prompted by the prompt 302 and a selected suggestion 312 may be provided as additional user input to the product identification service 120. In an aspect, the user interface 304 includes an icon or a button, such as a "GO" button 314, which allows the user 110 to dispatch user input entered into the field 310, which may include a selected suggestion 312, to the product identification service 120 without engaging with the prompt 302. In an aspect, the user interface 304 includes additionally includes barcode icon or button 316 that may allow the user 110 to provide a scan of a barcode associated with the item even if a barcode scan is not suggested by the prompt 302. In other aspects, one or more of the suggestions 312, the GO icon or button 314 and the barcode icon or button 316 may be omitted from the user interface 304.

Figure 4:
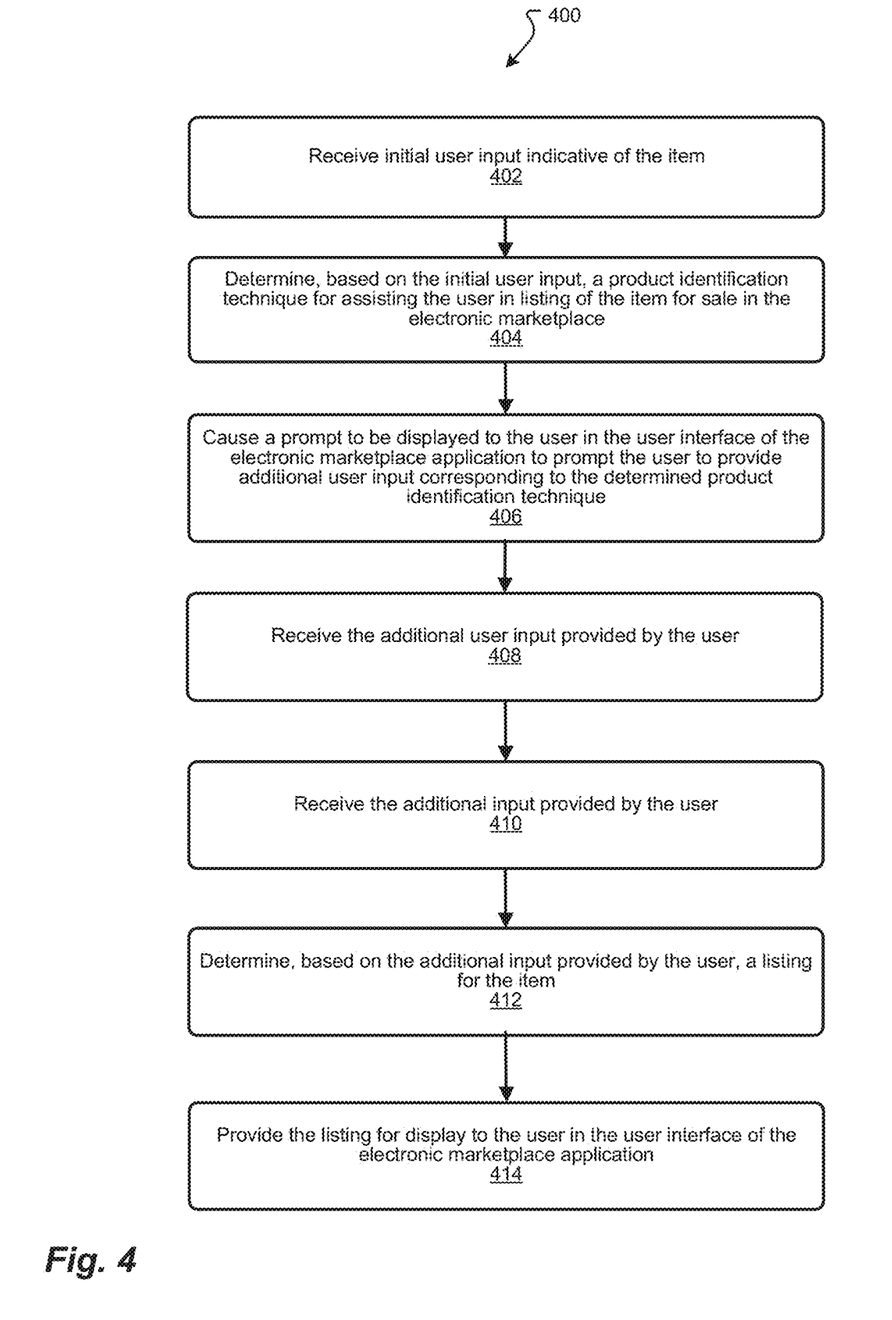
FIG. 4 illustrates an exemplary method for dynamically displaying a user interface prompt to prompt a user to provide additional item identification information, in accordance with aspects of the present disclosure.

FIG. 4 illustrates an exemplary method 400 for assisting a user in listing an item for sale in an electronic marketplace via an electronic marketplace application, in accordance with aspects of the present disclosure. In one example, the method 400 may be performed by a client device to assist a user in listing an item for sale in an electronic marketplace using an electronic marketplace application. A general order of the operations for the method 400 is shown in FIG. 4. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3, 5 and 6.

Method 400 begins at operation 402 at which initial user input indicative of the item is received. The initial user input may be entered by the user into a user interface of the electronic marketplace application. The initial user input may comprise one or more keywords entered by the user into the user interface of the electronic marketplace application. The initial user input may additionally, or alternatively, include other user input indicative of an item, such as an image or a video stream depicting the item. The initial user input may be received dynamically as the user is entering the user input into the user interface of the electronic marketplace application. For example, a plurality of requests may be received, each request indicating one or more detected keystrokes as the user is entering one or more keywords into the user interface user interface of the electronic marketplace application.

At operation 404, a product identification technique for assisting the user in listing of the item for sale in the electronic marketplace is determined based on the initial user input received at operation 402. In aspects, determining the product identification technique at operation 404 includes selecting the product identification technique from among multiple product identification technique which may include, but not limited to, one or more of i) image recognition, ii) barcode scanning and iii) optical character recognition/image recognition. In an aspect, a category of the item is determined based on the initial user input, and the product identification technique is determined based at least in part on the category of the item. As an example, image recognition may be selected if the item is a trading card whereas barcode scanning is selected if the item is a book. In some aspects, the product identification technique is additionally or alternatively determined based at least in part based on one or more attributes of the item that may be extracted from the initial user input. In other embodiments, other suitable parameters may additionally, or alternatively, be utilized to determine the product identification technique based on the initial user input received at operation 402.

At operation 406, a prompt is displayed to the user in the user interface of the electronic marketplace application to suggest to the user to provide additional user input corresponding to the product identification technique determined at operation 404. For example, additional user input request may be generated and provided to the electronic marketplace application to cause the prompt to be displayed to the user, where the additional user input request may indicate the product identification technique determined at operation 404. The additional user input that the user may be prompted to provide may comprise one or more of i) a scan of a barcode associated with the item, ii) an image of the item, iii) an image of a particular portion of the item, and iii) additional information specific to a category corresponding to the item.

At operation 408, the additional user input provided by the user may be received. For example, one or more of i) a scan of a barcode associated with the item, ii) an image of the item, iii) an image of a particular portion of the item, and iii) additional information specific to a category corresponding to the item may be received. The additional user input may be provided by the user by engaging with the prompt displayed to the user to launch a corresponding experience (e.g., a camera experience, a barcode experience, etc.) in the user interface of the electronic marketplace application.

At operation 410, a listing for sale of the item may be generated. The listing for sale of the item may be generated based at least in part on a product identification that may utilize the product identification technique determined at operation 404 and the corresponding additional user input received at operation 408. For example, image recognition or a barcode scan may be performed based on one or more images of the item or an image of the barcode that may be received at operation 408 to locate a matching product in a database. The listing may then be generated based on product information that may be associated with the matching product in the database.

At operation 412, the listing for sale of the item generated at operation 410 may be provided for display to the user in the user interface of the electronic marketplace application. The user may then accept the listing, edit the listing, add details to the listing etc., prior to publishing the listing via the user interface of the electronic marketplace application.

Figure 5:
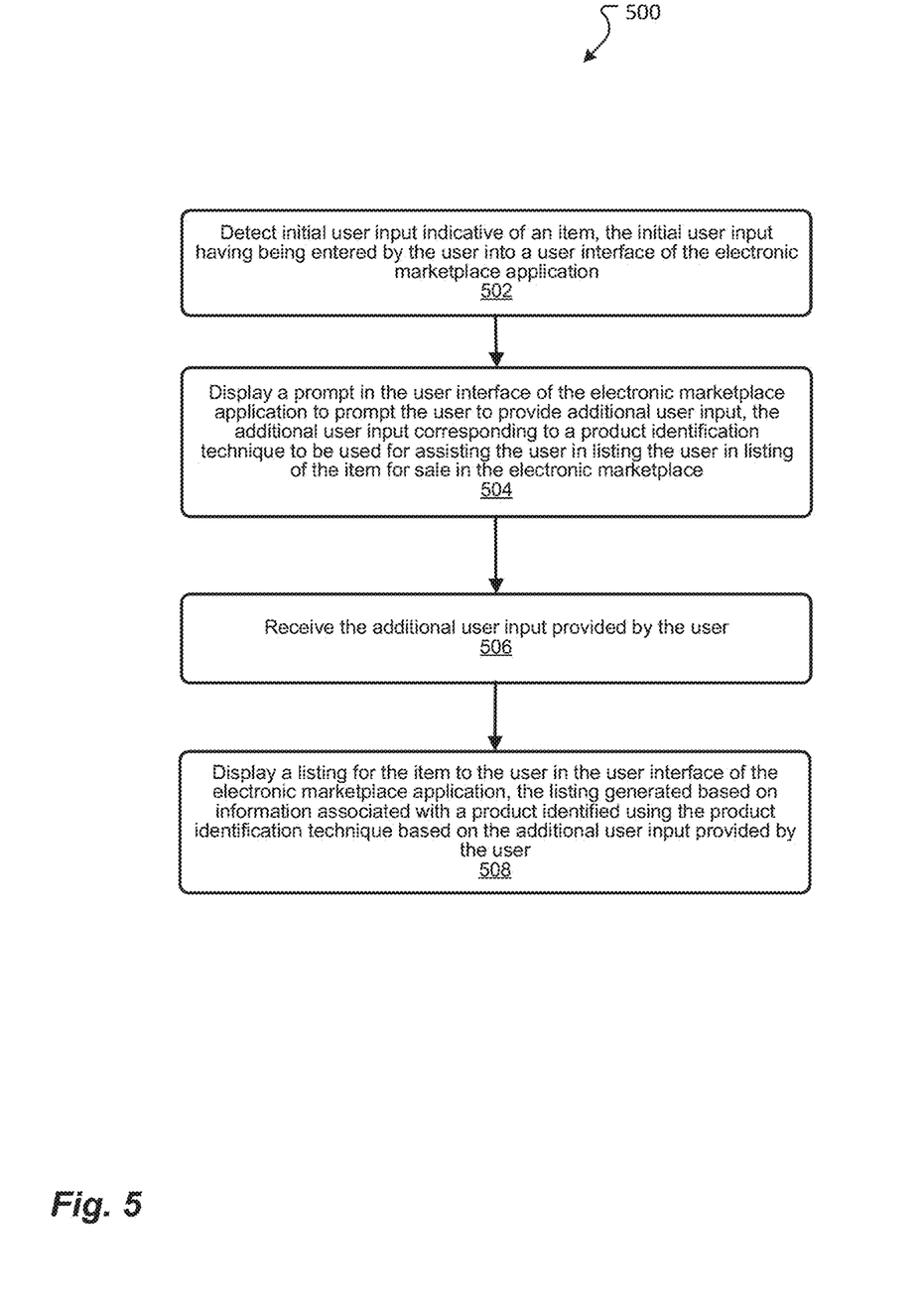
FIG. 5 illustrates an exemplary method for determining a type of additional item identification information to be obtained from a user based on initial item identification input provided by a user via an electronic marketplace application, in accordance with aspects of the present disclosure.

FIG. 5 illustrates an exemplary method 500 for assisting a user in listing an item for sale in an electronic marketplace via an electronic marketplace application, in accordance with aspects of the present disclosure. In one example, the method 500 may be performed by a server device to determine a type of additional item identification information to be obtained to assist a user in listing an item for sale via an electronic marketplace. A general order of the operations for the method 500 is shown in FIG. 5. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4 and 6.

Method 500 begins at operation 502 at which initial user input indicative of an item is detected when the initial user is entered by the user into a user interface of the electronic marketplace application. The initial user input may comprise one or more keywords entered by the user into the user interface of the electronic marketplace application. The initial user input may additionally, or alternatively, include other user input indicative of an item, such as an image or a video stream depicting the item. The initial user input may be detected dynamically as the user is entering the user input into the user interface of the electronic marketplace application. For example, each keystroke may be detected as the user is entering one or more keywords into the user interface user interface of the electronic marketplace application At operation 504, a prompt is displayed in the user interface of the electronic marketplace application to prompt the user to provide additional user input corresponding to a product identification technique to be used for assisting the user in listing the item for sale in the electronic marketplace. The product identification technique to be used in assisting the user is determined based on the initial user input indicating of the item. In aspects, the product identification technique may be selected, based on the initial user input, from among multiple identification techniques which may include, but not limited to, one or more of i) image recognition, ii) barcode scanning and iii) optical character recognition/image recognition. In aspects, the additional user input that the user may be prompted to provide may comprise one or more of i) a scan of a barcode associated with the item, ii) an image of the item, iii) an image of a particular portion of the item, and iii) additional information specific to a category corresponding to the item. In other aspects, other product identification techniques may be determined based on the initial user input and/or the user may be prompted to provide other types additional user input.

At operation 506, the additional user input provided by the user is received. For example, one or more of i) a scan of a barcode associated with the item, ii) an image of the item, iii) an image of a particular portion of the item, and iii) additional information specific to a category corresponding to the item may be received. The additional user input may be provided by the user by engaging with the prompt displayed to the user to launch a corresponding experience (e.g., a camera experience, a barcode experience, etc.) in the user interface of the electronic marketplace application.

At operation 508, a listing for sale of the item is displayed to the user in the user interface of the electronic marketplace application. In aspects, the listing is generated based on information associated with a product identified using the product identification technique based on the additional user input provided by the user. For example, image recognition or a barcode scan may be performed based on one or more images of the item or an image of the barcode that may be received at operation 506 to locate a matching product in a database. The listing may then be generated based on product information that may be associated with the matching product in the database. The user may then accept the listing, edit the listing, add details to the listing etc., prior to publishing the listing via the user interface of the electronic marketplace application.

Figure 6:
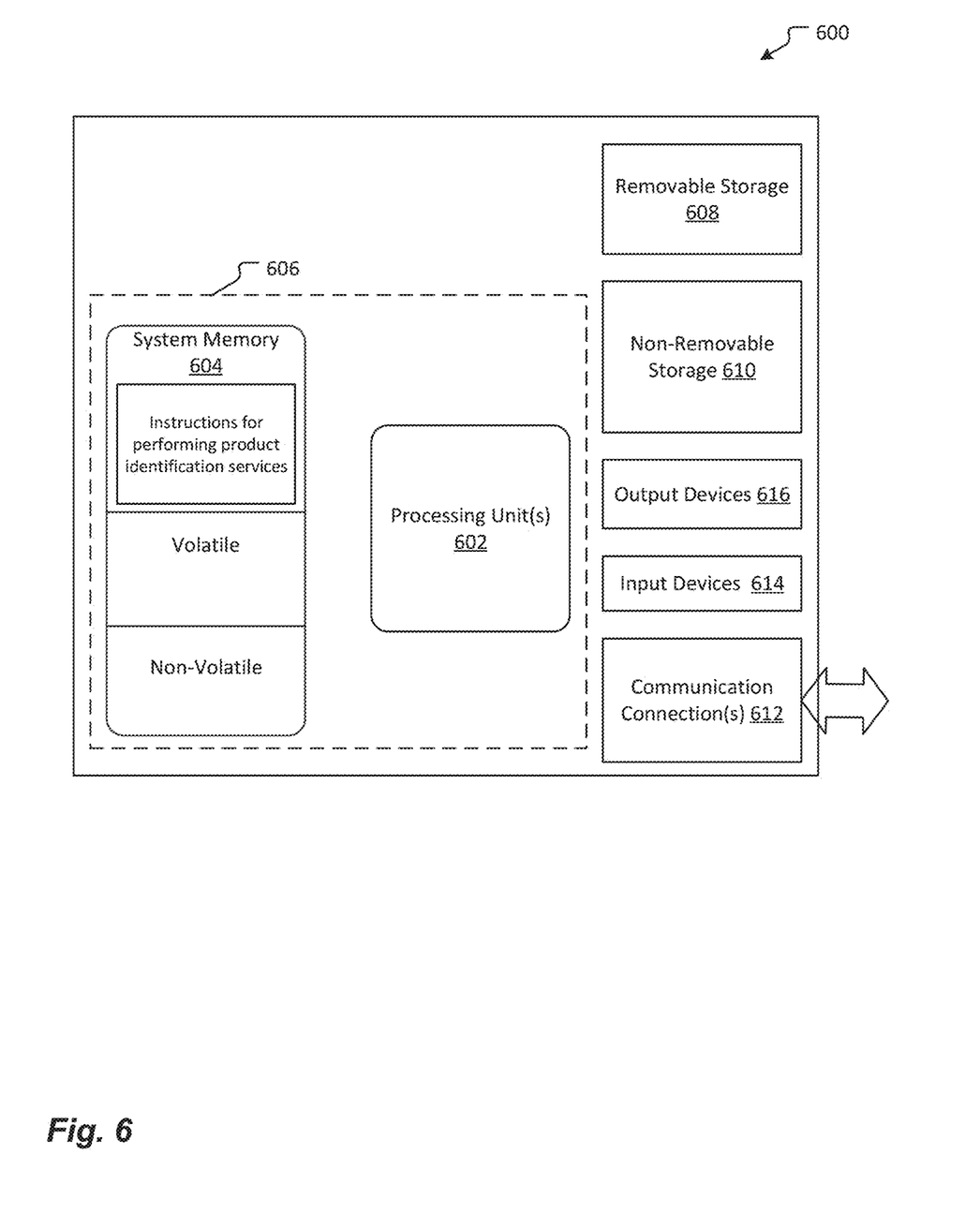
FIG. 6 is a block diagram illustrating example physical components of a computing device with which aspects of the disclosure may be practiced.

FIG. 6 illustrates a simplified block diagram of the device with which aspects of the present disclosure may be practiced in accordance with aspects of the present disclosure. One or more of the present aspects may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions for performing product identification services described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, touch screens, accelerometers, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, the system comprising:
    a processor; and
    memory including instructions which, when executed by the processor, causes the processor to perform operations comprising:
        receiving, via a user interface of an electronic marketplace application, initial user input indicative of an item and a category corresponding to the item;
        extracting one or more attributes of the item from the initial user input based on the category corresponding to the item;
        accessing an identification selection rules database to obtain a product identification technique based on the category corresponding to the item and the one or more attributes, the product identification technique including one or more computer vision services associated with identifying a product that matches the item, wherein the identification selection rules database stores associations between a plurality of categories including the category, a plurality of attributes including the one or more attributes, and a plurality of product identification techniques including the product identification technique;
        displaying, via the user interface, a prompt to provide additional user input corresponding to the product identification technique;
        receiving, via a camera in response to engagement with the prompt, the additional user input;
        generating, based on the additional user input, a listing for sale of the item by using the product identification technique to identify the product that matches the item; and
        providing, via the user interface, the listing for display.

2. The system of claim 1, the operations further comprising selecting the product identification technique from among two or more of i) image recognition, ii) barcode scanning or iii) optical character recognition.

3. The system of claim 1, wherein the additional user input comprises one or more of i) a scan of a barcode associated with the item, ii) an image of the item, iii) an image of a particular portion of the item, or iv) additional information specific to the category corresponding to the item.

4. The system of claim 1, wherein the additional user input comprises a scan of a barcode associated with the item based on the prompt including an indication of a location of the barcode associated with the item.

5. The system of claim 1, wherein the additional user input comprises an image of an area of the item based on the prompt including an indication of the area of the item.

6. The system of claim 1, wherein the initial user input comprises one or more keywords.

7. The system of claim 6, the operations further comprising:
    determining, based on the one or more keywords, the category corresponding to the item.

8. The system of claim 6, wherein the one or more attributes are extracted from the one or more keywords.

9. The system of claim 1, wherein to receive the initial user input, the operations further comprise receiving a plurality of consecutive requests corresponding to a respective key stroke.

10. The system of claim 1, the operations further comprising:
accessing, based on the additional user input, one or more product catalogues to identify the product that matches the item, and
generating the listing based at least in part on information associated with the product that matches the item.

11. The system of claim 1, wherein to determine the product identification technique, the operations further comprise:
training a machine learning model based on one or more of i) user input, ii) the category corresponding to the item, or iii) the one or more attributes extracted from the initial user input; and
generating, using the machine learning model and using the category corresponding to the item as an input to the machine learning model, an indication of the product identification technique.

12. A method, the method comprising:
receiving, via a user interface of an electronic marketplace application, initial user input indicative of an item and a category corresponding to the item;
extracting, by a product identification technique determination engine, one or more attributes of the item from the initial user input based on the category corresponding to the item;
accessing, by the product identification technique determination engine, an identification selection rules database to obtain a product identification technique based on the category corresponding to the item and the one or more attributes, the product identification technique including one or more computer vision services associated with identifying a product that matches the item, wherein the identification selection rules database stores associations between a plurality of categories including the category, a plurality of attributes including the one or more attributes, and a plurality of product identification techniques including the product identification technique;
displaying, via the user interface, a prompt to provide additional user input corresponding to the product identification technique;
receiving, via a camera in response to engagement with the prompt, the additional user input
generating, by a product identification engine and based on the additional user input, a listing for sale of the item by using the product identification technique to identify the product that matches the item; and
displaying, via the user interface, the listing for sale of the item.

13. The method of claim 12, wherein the product identification technique is selected from among two or more of i) image recognition, ii) barcode scanning or iii) optical character recognition.

14. The method of claim 12, wherein the additional user input comprises one or more of i) a scan of a barcode associated with the item, ii) an image of the item, iii) an image of a particular portion of the item, or iv) additional information specific to the category corresponding to the item.

15. The method of claim 12, wherein the additional user input comprises a scan of a barcode associated with the item based on the prompt including an indication of a location of the barcode associated with the item.

16. The method of claim 12, wherein the additional user input comprises an image of an area of the item based on the prompt including an indication of an indication of the area of the item.

17. The method of claim 12, wherein displaying the prompt comprises dynamically displaying the prompt as the initial user input is received.

18. One or more non-transitory computer-readable storage medium storing instructions that, when executed by at least one processor, cause the at least one processor to perform operations comprising:
receiving, via a user interface of an electronic marketplace application, initial user input indicative of an item and a category corresponding to an item;
extracting, by a product identification technique determination engine, one or more attributes of the item from the initial user input based on the category corresponding to the item;
accessing, by the product identification technique determination engine, an identification selection rules database to obtain a product identification technique based on the category corresponding to the item and the one or more attributes, the product identification technique including one or more computer vision services associated with identifying a product that matches the item, wherein the identification selection rules database stores associations between a plurality of categories including the category, a plurality of attributes including the one or more attributes, and a plurality of product identification techniques including the product identification technique;
displaying, via the user interface, a prompt to provide additional user input corresponding to the product identification technique;
receiving, via a camera in response to engagement with the prompt, the additional user input;
generating, by a product identification engine and based on the additional user input, a listing for sale of the item by using the product identification technique to identify the product that matches the item; and
providing, via the user interface, the listing for display.

19. The one or more non-transitory computer-readable storage medium of claim 18, the operations further comprising selecting the product identification technique from among two or more of i) image recognition, ii) barcode scanning and iii) optical character recognition.

20. The one or more non-transitory computer-readable storage medium of claim 18, wherein the additional user input comprises one or more of i) a scan of a barcode associated with the item, ii) an image of the item, iii) an image of a particular portion of the item, or iv) additional information specific to the category corresponding to the item.

* * * * *